United States Patent
Lee et al.

(10) Patent No.: US 9,305,336 B2
(45) Date of Patent: Apr. 5, 2016

(54) APPARATUS AND METHOD FOR ESTIMATING NOISE

(71) Applicant: SAMSUNG ELECTRONICS CO., LTD., Suwon-si (KR)

(72) Inventors: Hyun-seung Lee, Seoul (KR); Seung-gu Kim, Seoul (KR); Se-Hyeok Park, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 161 days.

(21) Appl. No.: 14/024,054

(22) Filed: Sep. 11, 2013

(65) Prior Publication Data

US 2014/0071156 A1   Mar. 13, 2014

(30) Foreign Application Priority Data

Sep. 11, 2012  (KR) .................. 10-2012-0100279

(51) Int. Cl.
*G06T 5/00* (2006.01)
*G06T 7/00* (2006.01)

(52) U.S. Cl.
CPC ............. *G06T 5/002* (2013.01); *G06T 7/0002* (2013.01); *G06T 2207/10016* (2013.01); *G06T 2207/30168* (2013.01)

(58) Field of Classification Search
CPC ............. G06T 5/002; G06T 2207/20182; G09G 3/2048; H04N 5/357; H04N 5/365
See application file for complete search history.

(56) References Cited

U.S. PATENT DOCUMENTS

| | | | |
|---|---|---|---|
| 5,361,105 A | 11/1994 | Iu | |
| 6,285,710 B1 | 9/2001 | Hurst, Jr. et al. | |
| 2007/0223839 A1* | 9/2007 | Kisilev et al. | 382/286 |
| 2011/0037900 A1 | 2/2011 | Rhee | |
| 2012/0133836 A1* | 5/2012 | Raffalli et al. | 348/607 |
| 2013/0011081 A1* | 1/2013 | Luo et al. | 382/298 |

* cited by examiner

*Primary Examiner* — Antonio A Caschera
(74) *Attorney, Agent, or Firm* — Sughrue Mion, PLLC

(57) ABSTRACT

A noise estimation apparatus and method to prevent texture from being erroneously determined as noise. To this end, the noise estimation method includes generating an initial noise map for an input image signal, generating at least one noise map based on a temporal change of an image signal continuing from the image signal, calculating a correlation value for each region between the initial noise map and the noise maps, and determining noise of an image according to a temporal change based on the correlation value.

14 Claims, 3 Drawing Sheets

APPARATUS AND METHOD FOR ESTIMATING NOISE

CROSS-REFERENCE TO RELATED APPLICATION

This application claims priority from Korean Patent Application No. 10-2012-0100279, filed in the Korean Intellectual Property Office on Sep. 11, 2012, the entire disclosure of which is hereby incorporated by reference.

BACKGROUND

1. Field

Apparatuses and methods consistent with exemplary embodiment relate to an apparatus and method for estimating noise of an image signal.

2. Description of the Related Art

Numerous methods for noise processing have been developed so far. In particular, for an image signal presented in a device which expresses a video image, such as a television, if the image signal has much noise and thus its display quality is significantly degraded, the display quality may be remarkably improved by processing the noise. Representative noise canceling methods may include a two-dimensional (2D) noise canceling method as a spatial processing method, a three-dimensional (3D) noise canceling method as a tempo-spatial noise canceling method, and so forth.

The aforementioned noise canceling methods show excellent performance in light of noise cancellation for an image having much noise. However, they show poor performance in terms of noise cancellation and at the same time, protection of an image component, for a broadcast image having a little noise.

This is because the conventional methods process a noise dispersion value, which is a criterion for determining noise, as a constant value, regardless of a region, assuming that noise is a component independent of a signal. However, in practice, in an image signal, the amplitude of noise varies from region to region. For some regions, leaving noise, which does not change temporally, in an image may result in subjectively better display quality in a sense that texture is preserved.

FIG. 1 is a diagram of a general noise estimation block.

Referring to FIG. 1, an image receiver 110 receives an image signal and outputs the image signal to a frame buffer 120.

The frame buffer 120 buffers the input image signal in predetermined units, and outputs the image signal after a predetermined time.

A noise estimator 140 receives the image signal output from the frame buffer 120 and an image signal which temporally continues from the image signal, and calculates a dispersion value of noise values after a noise value over a predetermined value is canceled, out of noise values generated due to the time.

In noise calculation, the noise estimator 140 obtains an average of differences between the image and its neighboring images, and estimates a representative noise dispersion value for all the regions.

The noise canceller 150 cancels noise from the input image signal by referring to the estimated noise dispersion value.

The conventional methods show poor performance in a broadcast image having weak noise because of processing the noise dispersion value as a constant value regardless of a region.

The noise left in the image does not negatively affect the display quality or resolution of the reproduced image signal when it is displayed on a small-screen display. However, when such noise is displayed on a large-screen display, the noise is displayed after being enlarged, thus negatively affecting the display quality or resolution of the reproduced image signal. To solve the display quality degradation problem, noise processing is required.

SUMMARY

Accordingly, exemplary embodiments provide a method and apparatus for estimating noise adaptively to a region based on motion of an image.

Exemplary embodiments also provide a method and apparatus for improving display quality.

According to an aspect of an exemplary embodiments, there is provided a noise estimation method including generating an initial noise map for an input image signal, generating at least one noise map based on a first temporal change of an image signal continuing from the input image signal, calculating a correlation value for each region between the initial noise map and the at least one noise map, and determining noise of an image according to a second temporal change based on the correlation value.

The noise estimation method may further comprise adjusting a strength of noise for each region based on a result of the noise determination.

The initial noise map may be determined by:

$$Map_n = Y_n - Y_{NR,n}$$

where $Map_n$ indicates a noise map of an $n^{th}$ frame, and $Y_{NR,n}$ indicates a noise-cancellation result of the $n^{th}$ frame, and $Y_n$ indicates an image which has not yet been noise-canceled.

The correlation value may be determined by:

$$Corr(Map_n, Map_{n-1}) = \frac{1}{|Map_n - Map_{n-1}| + c},$$

wherein $Corr(Map_n, Map_{n-1})$ indicates a correlation value between two noise maps, and c indicates a constant value.

The determining of the noise of the image may comprise determining a final noise dispersion map based on the correlation value, and the final noise dispersion map is determined by:

$$NV(i, j) = \frac{1}{Corr(Map_n(i, j), Map_{n-1}(i, j)) + C},$$

wherein NV (i, j) indicates a noise dispersion size of an $(i, j)^{th}$ pixel, and c indicates a constant value.

The determining of the noise of the image may comprise: comparing the correlation value with a threshold value; excluding a corresponding portion from the noise determination if the correlation value is less than the threshold value; and determining the corresponding portion as noise if the correlation value is greater than the threshold value.

According to another aspect of an exemplary embodiments, there is provided a noise estimation apparatus including a noise map generator configured to generate an initial noise map for an input image signal and generate at least one noise map based on a first temporal change of an image signal continuing from the input image signal and a noise estimator configured to calculate a correlation value for each region between the initial noise map and the noise maps and determine noise of an image according to a second temporal change based on the correlation value.

The noise estimator may adjust a strength of noise for each region based on a result of the noise determination.

The noise estimator may determine a final noise dispersion map based on the correlation value, and the final noise dispersion map is determined by:

$$NV(i, j) = \frac{1}{\text{Corr}(\text{Map}_n(i, j), \text{Map}_{n-1}(i, j)) + C},$$

wherein $NV(i, j)$ indicates a noise dispersion size of an $(i, j)^{th}$ pixel, and c indicates a constant value.

The noise estimator, when determining the noise of the image, may compare the correlation value with a threshold value, exclude a corresponding portion from the noise determination if the correlation value is less than the threshold value, and determine the corresponding portion as noise if the correlation value is greater than the threshold value.

The constant value may be changeable and the threshold value may be predetermined.

BRIEF DESCRIPTION OF THE DRAWINGS

The above and other features of exemplary embodiments will be more apparent from the following detailed description taken in conjunction with the accompanying drawings, in which.

DETAILED DESCRIPTION

Hereinafter, exemplary embodiments will be described in detail with reference to the accompanying drawings. In addition, a detailed description of well-known functions and constructions will not be provided if they unnecessarily obscure the subject matter of the present invention.

The terms or words used in the specification and claims should not be limited to be construed as typically construed or by dictionary definition but should be rather construed to be consistent with the technical spirits of the present invention based on the principle that the inventors may properly define the terms used in the specification to describe their invention in the best manner.

The exemplary embodiments propose an adaptive noise estimation method which includes a part for generating an initial noise map in a plurality of continuous images and a part for finally determining a noise dispersion value by calculating a correlation value between noise maps.

Figure 2:
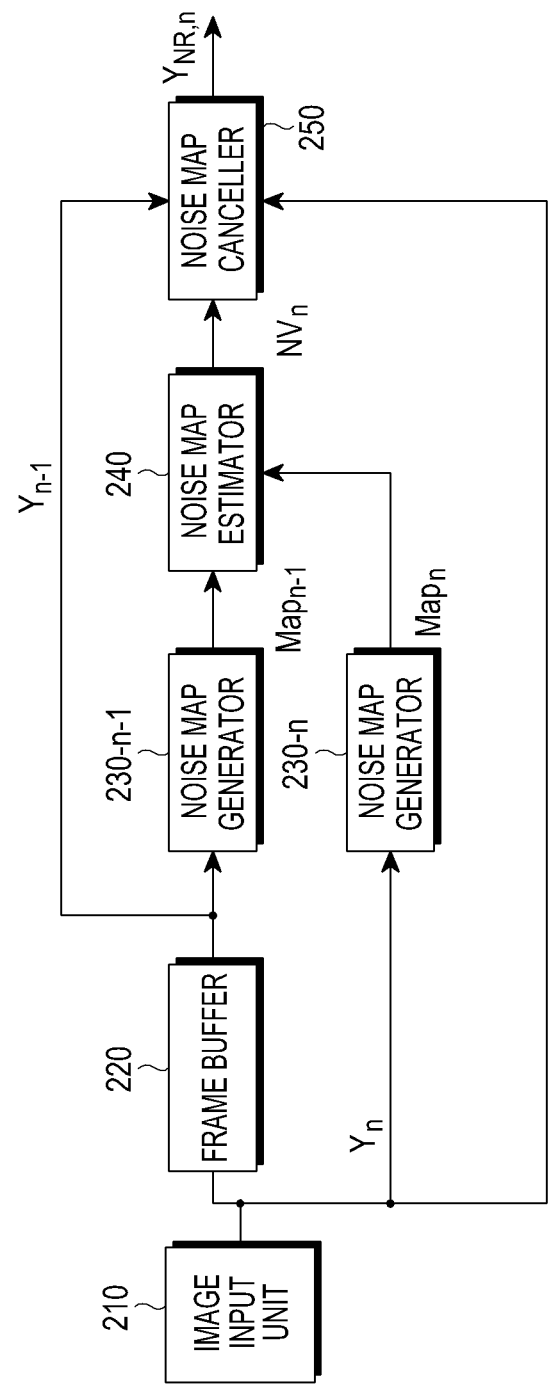
FIG. 2 is a diagram of a noise estimation block according to an exemplary embodiment.

FIG. 2 is a diagram of a noise estimation block according to an exemplary embodiment.

Figure 1:
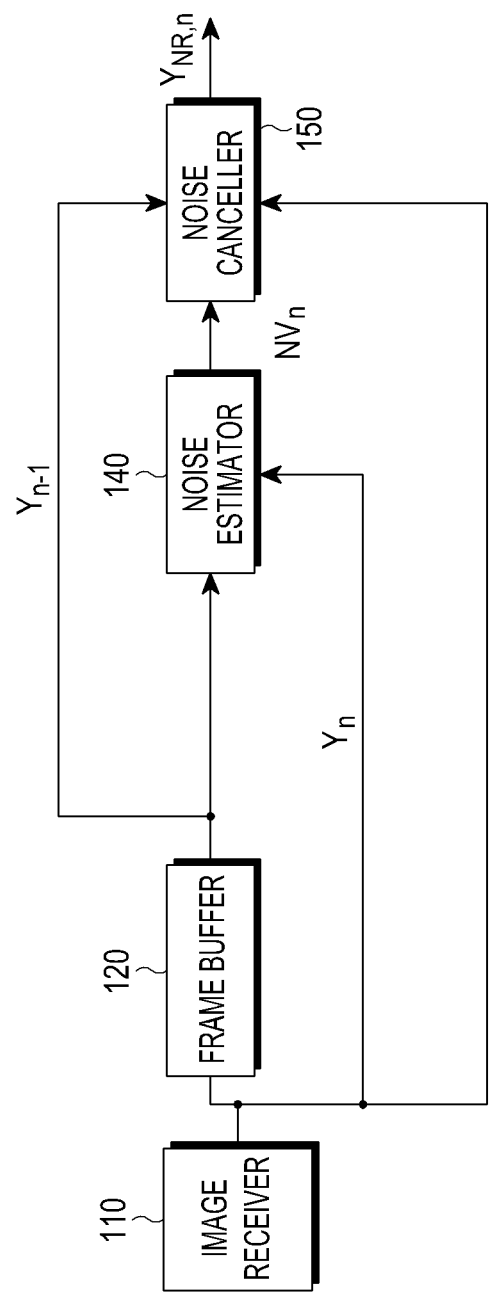
FIG. 1 is a diagram of a general noise estimation block.

The block shown in FIG. 2 is the same as that shown in FIG. 1, except that noise map generators 230-n and 230-n-1 are added. An image receiver 210 and a frame buffer 220 are the same as the image receiver 110 and the frame buffer 120 of FIG. 1.

According to the noise estimation method proposed in an exemplary embodiment, the noise map generator 230-n-1 generates an initial noise map. The noise map generator 230-n generates noise maps following the initial noise map according to a temporal change.

The generation of the initial noise map performed in the noise map generator 230-n-1 involves calculating a difference between an image from which initial noise is canceled using spatial noise cancellation, and an image from which noise has not yet been canceled. An initial noise map of an nth frame may be obtained by:

$$\text{Map}_n = Y_n - Y_{NR,n} \tag{1}$$

wherein $\text{Map}_n$ indicates a noise map of an nth frame, $Y_{NR,n}$ indicates a noise-cancellation result of the nth frame, and $Y_n$ indicates an image which has not yet been noise-canceled. It should be noted that noise cancellation may use various methods. More specifically, as a noise cancellation method, a Low Pass Filter (LPF), a bilateral filter, etc., may be used.

In the generated initial noise map, some components of an edge and texture components which have similar image signal characteristics may also be included together with noise. For this reason, if noise separated through the initial noise map is entirely canceled, the image may look flat.

Spatially changing noise may help in giving detailed expression of an image to human visual systems, but the human visual systems are very sensitive to temporally changing noise, such that it is necessary to selectively cancel only the temporally changing noise.

According to an exemplary embodiment, a noise map estimator 240 uses for noise determination, a noise map extracted from a neighboring frame as well as a noise map extracted from the current field. The noise map estimator 240 determines noise based on a correlation value between a noise map extracted from a previous or next field and a noise map extracted from the current field??claim feature??. That is, the noise is determined based on a correlation value between noise maps??claim feature??. For a portion corresponding to a high correlation value between noise maps, the portion has a small temporal change, and thus is excluded from noise determination; a portion corresponding to a low correlation value is determined to be noise.

The correlation value may be obtained in various ways, and a relatively simple correlation value may be obtained as a difference between two noise maps as expressed by:

$$\text{Corr}(\text{Map}_n, \text{Map}_{n-1}) = \frac{1}{|\text{Map}_n - \text{Map}_{n-1}| + c}, \tag{2}$$

wherein $\text{Corr}(\text{Map}_n, \text{Map}_{n-})$ indicates a correlation value between two noise maps, and c indicates a constant value which can be changed.

For a final noise dispersion map, if a correlation value between consecutive frames is higher than a reference value, a weight value is set small; if the correlation value is lower than the reference value, the weight value is set high. That is, a region-based noise dispersion value is estimated in inverse proportion to the correlation value.

The final noise dispersion map may be determined by:

$$NV(i, j) = \frac{1}{\text{Corr}(\text{Map}_n(i, j), \text{Map}_{n-1}(i, j)) + C}, \tag{3}$$

wherein $NV(i, j)$ indicates a noise dispersion size of an $(i, j)^{th}$ pixel, and c indicates a constant value which can be changed.

A noise map canceller 250 estimates a dispersion value of noise according to the size of the final noise dispersion map, and adjusts the strength of noise cancellation from region to region according to the dispersion value. That is, according to the size of the final noise dispersion map, the strength of noise cancellation is adjusted for each region.

A simple implementation form may be a mixing form, and a weight value may be used in mixing a noise-canceled image and the original image.

A result of final noise cancellation may be expressed as follows:

$$Y_{NR}'=(1-NV)\cdot Y+NV\cdot Y_{NR} \quad (4),$$

wherein $Y_{NR}'$ is a result of final noise cancellation, and $Y_{NR}$ indicates an initial-noise-canceled image.

The initial-noise-canceled image may be generated in various ways.

Figure 3:
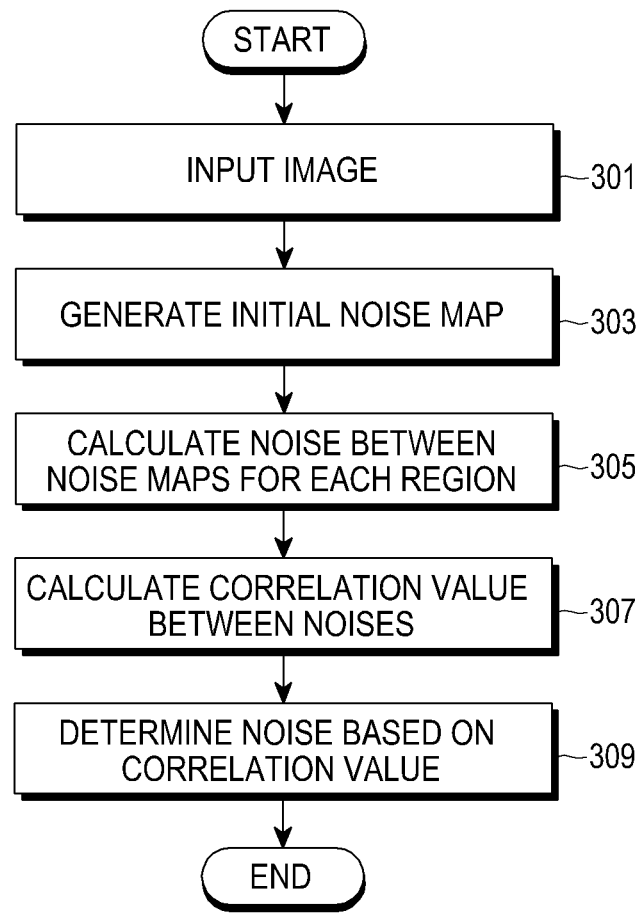
FIG. 3 is a flowchart of a noise estimation method according to an exemplary embodiment.

FIG. 3 is a flowchart of a noise estimation method according to an exemplary embodiment.

An image is input in operation 301, and an initial noise map is generated from the input image in operation 303. The initial noise map may be obtained using Equation 1.

In operation 305, noise between noise maps for each region is calculated. That is, at least one noise map according to a temporal change of an image signal continuing from the input image signal is generated.

In operation 307, a region-based correlation value between the initial noise map and the at least one noise map is calculated. In operation 309, based on the correlation value, noise is determined.

That is, for a portion corresponding to a high correlation value between noise maps, the portion has a small temporal change, and thus is excluded from noise determination; a portion corresponding to a low correlation value is determined as noise. For example, a correlation value between noise maps is compared with a predetermined threshold value, such that if the correlation value is smaller than the threshold value, a corresponding portion is excluded from noise cancellation; if the correlation value is larger than the threshold value, the portion is determined as noise.

As is apparent from the foregoing description, the accuracy of noise estimation can be improved, thus improving the performance of a conventional noise cancellation method. That is, a texture component which may be lost due to erroneous determination of noise can be preserved. When noise cancellation is performed by the conventional methods, the texture component of a hair is lost, but with the proposed method, the texture component is all preserved.

Therefore, exemplary embodiments can improve display quality by canceling noise adaptively to a region.

The exemplary embodiments also reduce a probability of erroneously determining texture as noise.

The exemplary embodiments improve display quality.

The exemplary embodiments may protect noise, which does not change temporally, and texture, while canceling temporally changing noise through a noise cancellation process.

The exemplary embodiments may be executed as computer-recordable code on a computer-recordable medium. The computer-recordable medium may be any data storage device capable of storing data which can be read by a computer system. For example, the computer-readable recording medium may be a read-only memory (ROM), a random-access memory (RAM), a compact disc (CD)-ROM, a magnetic tape, a floppy disc, an optical disc, an optical data storage device, and so forth.

The computer-readable recording medium can also be distributed over network-coupled computers so that the computer-recordable code is stored and executed in a distributed fashion. The exemplary embodiments may also be recorded as a computer program transmitted via a recordable transmission medium such as a computer carrier waveform, and may be received and executed on a general-purpose or special-purpose computer which can execute the program. One or more units of the noise estimation apparatus and the noise estimation apparatus may include a processor or a microprocessor capable of executing a computer program stored on a computer-recordable medium.

The present invention is not limited by the foregoing exemplary embodiments and the accompanying drawings because various substitutions, modifications, and changes can be made by those of ordinary skill in the art without departing from the technical spirit of the present invention.

What is claimed is:

1. A noise estimation method comprising:
generating a first noise map including a plurality of regions for a current image;
generating at least one second noise map including the plurality of regions for at least one image after the current image;
calculating a plurality correlation values for each of the plurality of regions between the first noise map and the at least one second noise map;
determining noise of the current image based on the calculated correlation values for each region; and
adjusting a strength of noise cancellation for said each region based on a result of the noise determination,
wherein the determining of the noise of the current image comprises:
comparing correlation value for a corresponding region with a threshold value;
excluding the corresponding region from the noise determination if the correlation value for the corresponding region is less than the threshold value; and
determining the corresponding region as noise if the correlation value for the corresponding region is greater than the threshold value.

2. The noise estimation method of claim 1, wherein each of the first noise map and the at least one second noise map is determined by:

$$Map_n = Y_n - Y_{NR,n},$$

where $Map_n$ indicates a noise map of an $n^{th}$ frame, and $Y_{NR,n}$ indicates a noise-cancellation result of the $n^{th}$ frame, and $Y_n$ indicates an image which has not yet been noise-canceled, and "n" is a natural number.

3. The noise estimation method of claim 1, wherein the correlation value is determined by:

$$\mathrm{Corr}(Map_n, Map_{n-1}) = \frac{1}{|Map_n - Map_{n-1}| + c},$$

wherein $\mathrm{Corr}(Map_n, Map_{n-1})$ indicates a correlation value between two noise maps, c indicates a constant value, and "n" is a natural number.

4. The noise estimation method of claim 3, wherein the constant value is changeable.

5. The noise estimation method of claim 1, wherein the determining of the noise of the current image comprises determining a final noise dispersion map based on the calculated correlation values for each region, and the final noise dispersion map is determined by:

$$NV(i, j) = \frac{1}{\text{Corr}(\text{Map}_n(i, j), \text{Map}_{n-1}(i, j)) + C},$$

wherein NV(i, j) indicates a noise dispersion size of an (i, j)$^{th}$ pixel, and c indicates a constant value, and wherein "i", "j", and "n" are natural numbers.

6. The noise estimation method of claim 5, wherein the constant value is changeable.

7. The noise estimation method of claim 1, wherein the threshold value is predetermined.

8. A noise estimation apparatus comprising:
a noise map generator configured to generate an initial noise map including a plurality of regions for an input image signal and generate at least one second noise map for at least one image signal after the current image; and
a noise estimator configured to calculate a plurality of correlation values for each of the plurality of regions between the first noise map and the at least one second noise map and determine noise of the current image based on the calculated correlation value for each region,
wherein the noise estimator adjusts a strength of noise for the each region based on a result of the noise determination, and
wherein the noise estimator, when determining the noise of the image, compares the correlation value for a corresponding region with a threshold value, excludes the corresponding region from the noise determination if the correlation value for a corresponding region is less than the threshold value, and determines the corresponding region as noise if the correlation value for a corresponding region is greater than the threshold value.

9. The noise estimation apparatus of claim 8, wherein each of the first noise map and the at least one second noise map is determined by:

$$\text{Map}_n = Y_n - Y_{NR,n},$$

where Map$_n$ indicates a noise map of an n$^{th}$ frame, and Y$_{NR,n}$ indicates a noise-cancellation result of the n$^{th}$ frame, and Y$_n$ indicates an image which has not yet been noise-canceled, and "n" is a natural number.

10. The noise estimation apparatus of claim 8, wherein the correlation value is determined by:

$$\text{Corr}(\text{Map}_n, \text{Map}_{n-1}) = \frac{1}{|\text{Map}_n - \text{Map}_{n-1}| + c},$$

wherein Corr(Map$_n$, Map$_{n-1}$) indicates a correlation value between two noise maps, c indicates a constant value, and "n" is a natural number.

11. The noise estimation apparatus of claim 10, wherein the constant value is changeable.

12. The noise estimation apparatus of claim 8, wherein the noise estimator determines a final noise dispersion map based on the calculated correlation value for each region, and the final noise dispersion map is determined by:

$$NV(i, j) = \frac{1}{\text{Corr}(\text{Map}_n(i, j), \text{Map}_{n-1}(i, j)) + C}, \quad (10)$$

wherein NV(i, j) indicates a noise dispersion size of an (i, j)$^{th}$ pixel, and c indicates a constant value, and wherein "i", "j", and "n" are natural numbers.

13. The noise estimation apparatus of claim 12, wherein the constant value is changeable.

14. The noise estimation apparatus of claim 8, wherein the threshold value is predetermined.

* * * * *